United States Patent
Liu

(10) Patent No.: US 7,245,946 B2
(45) Date of Patent: Jul. 17, 2007

(54) OPTIMAL POWER SAVING SCHEDULER FOR 802.11E APSD

(75) Inventor: Yonghe Liu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 277 days.

(21) Appl. No.: 10/614,367

(22) Filed: Jul. 7, 2003

(65) Prior Publication Data

US 2005/0009578 A1    Jan. 13, 2005

(51) Int. Cl.
*H04M 1/00* (2006.01)
(52) U.S. Cl. .................... 455/574; 455/512; 455/513
(58) Field of Classification Search ............. 455/574, 455/562.1, 343.3, 7, 572, 512, 513, 35.1, 455/453, 405; 700/79; 370/335, 311, 443, 370/252, 338; 709/207
See application file for complete search history.

(56) References Cited

U.S. PATENT DOCUMENTS

| | | | | |
|---|---|---|---|---|
| 5,828,568 | A * | 10/1998 | Sunakawa et al. | 700/79 |
| 6,072,784 | A * | 6/2000 | Agrawal et al. | 370/311 |
| 6,192,230 | B1 * | 2/2001 | van Bokhorst et al. | 455/343.3 |
| 6,295,553 | B1 * | 9/2001 | Gilbertson et al. | 709/207 |
| 6,335,922 | B1 * | 1/2002 | Tiedemann et al. | 370/335 |
| 6,404,772 | B1 * | 6/2002 | Beach et al. | 370/443 |
| 6,621,808 | B1 * | 9/2003 | Sadri | 370/335 |
| 6,662,024 | B2 * | 12/2003 | Walton et al. | 455/562.1 |
| 6,909,881 | B2 * | 6/2005 | Uehara et al. | 455/69 |
| 6,973,098 | B1 * | 12/2005 | Lundby et al. | 370/491 |
| 2002/0072329 | A1 * | 6/2002 | Bandeira et al. | 455/7 |
| 2002/0172217 | A1 * | 11/2002 | Kadaba et al. | 370/443 |
| 2004/0264397 | A1 * | 12/2004 | Benveniste | 370/311 |

OTHER PUBLICATIONS

Benveniste; Mathilde, Poll Scheduling and Power Saving, Dec. 15, 2002, pp. 1-6.*
Benveniste; Mathilde, Efficient Polling, Jan. 20, 2003, pp. 1-6.*
"Implementation Experiences of Bandwidth Guarantee on a Wireless LAN", Srikant Sharma, Kartik Gopalan, Ningning Zhu, Gang Peng, Pradipta De and Tzi-Cker Chiueh, taken from the Internet at; www.ecsl.cs.sunysb.edu/~chiueh/cse634/wrether.pdf, date unknown, 22 pages.

(Continued)

*Primary Examiner*—Duc M. Nguyen
*Assistant Examiner*—Chuck Huynh
(74) *Attorney, Agent, or Firm*—Steven A. Shaw; W. James Brady; Frederick J. Telecky, Jr.

(57) ABSTRACT

A new system and method is described, utilizing a scheduler based on a transmission power consumption calculation and prioritizing algorithm. The system utilizes the (APSD) protocol specified in the 802.11e draft for saving power in wireless local area networks. The system comprises an access point having a priority queue, one or more stations, an APSD frame comprising an association ID for identifying one of the stations and a scheduled wake-up time for the identified station. An algorithm is employed for calculating the total transmission power consumption of downlink data for the stations. The AP originates and transmits to the one or more stations the APSD frame of the scheduled activation delay time. The current data to be transmitted to each station is accessed by the algorithm to determine the total transmission power consumption to each station. A priority queue in the AP is ordered from the lowest to the highest receiving power consumption, assigning the highest priority to the lowest power consumption transmission to minimize total power consumption to the PS stations in the AP queue.

17 Claims, 6 Drawing Sheets

OTHER PUBLICATIONS

"Power Saving in Wireless LANs via Schedule Information Vector", Yonghe Liu, date unknown, 4 pgs.

"QoS Support on IEEE 802.11a (IEEE 802.11e)", PH, Rouzet, Jan. 26, 2002, 16 pgs.

"A Short Tutorial on Wireless LANs and IEEE 802.11", Daniel L. Lough, T. Keith Blankenship and Kevin J. Krizman, taken from the Internet at: http://www.computer.org/students/looking/summer97/ieee802.htm, date unknown, 5 pgs.

"Power-Saving Mechanisms in Emerging Standards for Wireless LANs: The MAC Level Perspective", Hagen Woesner, Jean-Pierre Ebert, Morten Schläger and Adam Wolisz, IEEE Personal Communications, Jun. 1998, pp. 40-48.

"IEEE 802.11e Wireless LAN for Quality of Service", Stefan Mangold, Sunghyun Choi, Peter May, Ole Klein, Guido Hiertz and Lothar Stibor, date unknown, 8 pgs.

"IEEE802.11 Tutorial", Jim Zyren and Al Petrick, taken from the Internet at: http://www.ydi.com/deployinfo/wp-80211-tutorial.php?screen=print, date unknown, 7 pgs.

"Draft Supplement to Standard For Telecommunications and Information Exchange Between Systems— LAN/MAN Specific Requirements—Part 11: Wireless Medium Access Control (MAC) and Physical Layer (PHY) Specifications: Medium Access Control (MAC) Enhancements for Quality of Service (QoS)", IEEE Std. 802.11e/D4.3, May 2003, (Draft Supplement to IEEE Std. 802.11, 1999 Edition), 28 pgs.

\* cited by examiner

| | SLOT TIME | SIFS TIME | PIFS TIME | DIFS TIME |
|---|---|---|---|---|
| 200 | 20 | 10 | 30 | 50 |

| 235 FIELD NAME | 240 ACTIVATION DELAY | 245 RESERVED | 250 APSD ELEMENT |
|---|---|---|---|
| OCTETS | 1 | 1 | 4 |

230

| 235 FIELD NAME | 280 ELEMENT ID (43) | 285 LENGTH (2) | 290 WAKEUP PERIOD | 295 BEACON OFFSET |
|---|---|---|---|---|
| OCTETS | 1 | 1 | 1 | 1 |

232

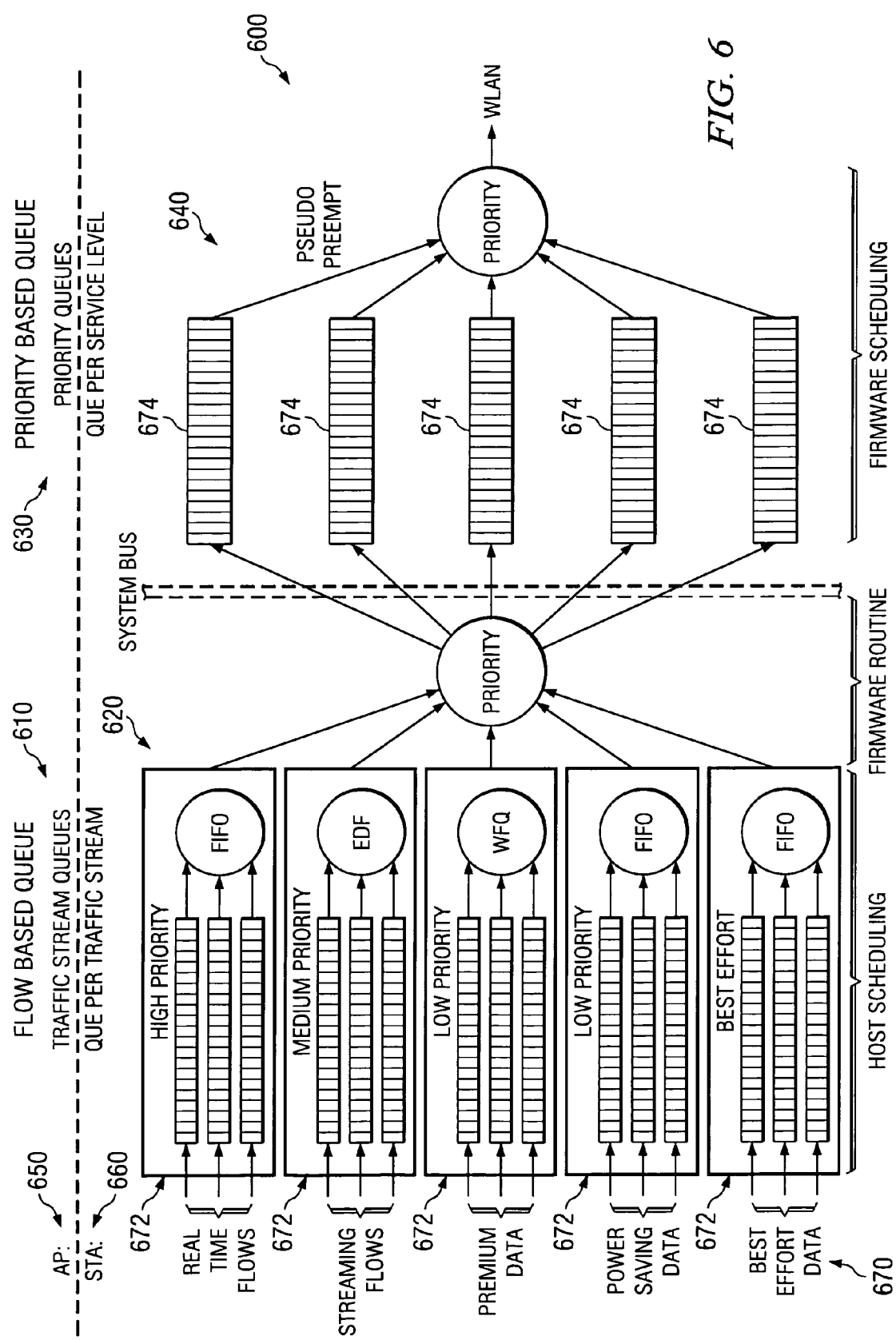

OPTIMAL POWER SAVING SCHEDULER FOR 802.11E APSD

FIELD OF INVENTION

The present invention relates generally to wireless networks and more particularly to systems and methods for saving power in wireless local area networks.

BACKGROUND OF THE INVENTION

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 is confined to standardizing processes and procedures that take place in the bottom two layers of the OSI (Open System Interconnection) reference model—the media access control (MAC) sublayer of the link layer and the physical layer.

The original standard that is currently used to establish a wireless local area network (WLAN) is the IEEE 802.11 standard. The IEEE 802.11 standard was published first in 1997 and it was designed to provide data rates up to 2 Mbps (such as a DSL connection) at 2.4 Ghz. The standard includes specifications for Media Access Control (MAC) and physical layer operation. The physical layer standard was designed to use either frequency hopping spread spectrum (FHSS) or direct sequence spread spectrum (DSSS). In 1999, 802.11a and 802.11b provided enhancements at the physical layer with higher data rate support up to 54 Mbps in the 5 GHz band and 11 Mbps in the 2.4 GHz band, respectively.

The newly developed 802.11e standard is working to enhance the current 802.11 MAC to expand support for applications with high QoS (Quality Of Service) requirements. Wireless networks fit both business and home environments, that both require the support of multimedia, and the 802.11e standard provides the solution for this need. In both wired and wireless networks, data transmission is susceptible to interruptions caused when packets are present or lost during the transmission process. These interruptions can cause problems for data to be streamed in a contiguous fashion. The 802.11e has created a QoS baseline document that proposes methods for handling time-sensitive traffic.

In the WLAN topology, each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

A standard WLAN according to 802.11 operates in one of two modes—ad-hoc (peer-to-peer) or infrastructure mode. The ad-hoc mode is defined as Independent BSS (IBSS), and the infrastructure mode as a BSS. WLANs may also be classified as distributed (ad-hoc), or as centralized systems (infra-structure based system).

In ad-hoc mode (IBSS), each client communicates directly with the other clients within the network on a peer-to-peer level sharing a given cell coverage area. This mode was designed such that only the clients within transmission range of each other can communicate. If a client in an ad-hoc network wishes to communicate outside of the range, one of the clients (members) must operate as a gateway and perform routing.

FIG. 1 illustrates the basic service set BSS 1 operating in the infrastructure mode, wherein a wireless network is formed between one or more stations (STA) 2 communicating with an access point (AP) 4 such as a communications tower. The access point acts as an Ethernet bridge and forwards the communications onto the network (e.g., either wired or wireless network). Several such BSS networks communicating together over the infrastructure between APs further form an Extended Service Set (ESS), or a Distribution System (DS).

Before stations and access points can exchange data, they must establish a relationship, or an association. Only if an association is established can the STA and AP exchange data. The association process involves three states:
 Unauthenticated and unassociated
 Authenticated and unassociated
 Authenticated and associated In the transition between the states, the communicating parties exchange messages called management frames. The APs are designed to transmit a beacon management frame at fixed intervals. To associate with an access point and join the BSS, a station listens for beacon messages to identify the access points within the range. After the station receives a beacon frame (message) it selects the BSS to join. The network names, or service set identifiers (SSID) contained in the beacon frame, permit the user to choose the SSID the user wishes to join. A station can also send a probe request frame to find the associated access point with the desired SSID. After the station identifies the access point, they perform an authentication by exchanging several management frames.

As illustrated in prior art FIG. 2, a wireless transceiver 20, according to the OSI (Open System Interconnection) reference model, comprises in part, a series of protocol layers 23 having a physical layer PHY 24, a data link layer 26, and a NETWORK layer 28. The data link layer 26 further comprises a medium access control MAC 26a sublayer and a logical link control LLC 26b sublayer. The OSI reference model describes networking as a series of protocol layers with a specific set of functions allocated to each layer. Each layer offers specific services to higher layers while shielding these layers from the details of how the services are implemented. A well-defined interface between each pair of adjacent layers defines the services offered by the lower layer to the higher one and how those services are accessed.

The physical layer PHY 24 is involved in the reception and transmission of the unstructured raw bit stream over a physical medium. It describes the electrical/optical, mechanical, and functional interfaces to the physical medium. The PHY 24 layer carries the signals for all the higher layers. The MAC 26a sublayer of the data link layer 26, manages access to the network media, checks frame errors, and manages address recognition of received frames.

The LLC 26b sublayer establishes and terminates logical links, controls frame flow, sequences frames, acknowledges frames, and retransmits unacknowledged frames. The LLC 26b sublayer uses frame acknowledgement and retransmission to provide virtually error-free transmission over the link to the layers above. The NETWORK layer 28 controls the operation of the subnet. It determines the physical path the data should take, based on network conditions, priority of service, and other factors, including routing, traffic control, frame fragmentation and reassembly, logical-to-physical address mapping, and usage accounting.

Wireless transceiver 20 also illustrates a packet of data 30 which may be transmitted or received via the NETWORK layer 28 and other higher level layers of the transceiver 20.

Wireless Local Area Networks (WLAN) are gaining increasing popularity today by establishing anywhere and anytime connections. According to recent predictions, the market of WLAN adapters will reach 35 million units in 2005. However, a larger market for WLAN lies in the mobile device world such as cellular phones and PDAs, whose market is projected to reach 500 million units in 2005.

As more WLAN chips are embedded into battery powered mobile devices, power consumption inevitably becomes a bottleneck to its wide deployment. The average power consumption for a typical WLAN adaptor, employing the power saving technique specified in the IEEE 802.11 standard, is significantly higher than a normal cellular phone. This further implies that a cellular phone with current battery capacity will be drained in substantially less time if a WLAN chip is embedded.

Recent advancements in circuit design have reduced the power consumption of WLAN chips dramatically in sleep mode. For example, the power consumption in deep sleep state is only 2 mw in the Texas Instruments TNETW1100B series chips. However this reduction alone is not able to alleviate the problem to the same degree in current wireless LANs, as the power reduction in the deep sleep mode cannot be fully utilized.

The impeding force is the broadcast based wireless MAC protocol. To receive a frame addressed to itself, a station has to continuously monitor the wireless channel and decode every frame for the MAC address to be checked against its own. Compared with the stations transmission or reception of data, this contending procedure commonly dominates the activity of a wireless station and prevents the station from sleeping. Consequently, power consumption during contention is a major contribution to battery drain.

Recent research proposes exploiting the low power consumption available during sleep mode. Allowing a station to wake up only periodically, often at several beacon intervals, this approach requires the AP to buffer power saving traffic and deliver it according to the station's pre-negotiated listening interval.

Although such an approach reduces the power consumption significantly, it does not fully address the problem. For example, all portable devices can benefit from power savings. With the increasing amount of power saving traffic, a station waking up at a certain beacon will likely face fierce competition retrieving or receiving data from the AP, and once again, waste significant power during contention. Further, power saving traffic may be associated with additional QoS and non-QoS constraints. For example, a voice traffic stream has a stringent delay requirement, but relatively low and periodic bandwidth consumption. However, the delay requirement will preclude the station from entering sleep mode according to the protocol given above, as frequently a beacon interval is about 100 ms. In addition, the situation is exacerbated by the increasing set of QoS applications incorporating WiFi networks. Further, powering on and off different modules in WLAN devices may incur additional power consumption and delays, if power savings techniques are not carefully applied.

Accordingly, there is a need for an improved protocol to address the problems associated with QoS as well as non-QoS traffic flows and minimizing total power consumption across all the power saving stations, while ensuring scalability during increased power saving traffic on a wireless local area network.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a new system and method implemented in the MAC sublayer, utilizing an optimal scheduler based on a total receiving power consumption calculation and prioritizing algorithm, used in association with the Automatic Power Saving Delivery (APSD) protocol for saving power in wireless local area networks, as identified in the IEEE 802.11e draft. The system and method of the present invention generally targets best effort power saving (PS) traffic utilizing the APSD protocol. In addition, although non-QoS PS traffic is the focus of this invention, several aspects of the invention facilitate both QoS and non-QoS power save traffic.

The power saving system utilizing the APSD protocol comprises an access point having a priority queue and an algorithm for calculating the total receiving power consumption (P) of downlink data to one or more stations, and an APSD frame. The APSD action frame itself, and the APSD element is fully detailed in sections 7.3.2, 7.4.1, and 11.2 of the IEEE 802.11e draft, therefore need only be summarized herein as to its' utility as one exemplary protocol that may be used in association with the present invention. The current data to be transmitted (e.g., $T_x$, downlinked) to each station is accessed by the algorithm, wherein the total receiving power consumption P to receive the data for each station is calculated. A priority queue (e.g., a temporary holding place for data) in the access point then, arranges the order of the transmissions to each station, by first transmitting data with the lowest receiving power consumption followed by those with higher power consumption transmissions to minimize the total power consumption for reception of the network.

Capability of APSD is exchanged between AP and a station through, for example, beacon, (re)association frames. A station capable of APSD may indicate its desire to enter the corresponding mode by sending the APSD element to the AP via (re)association or action frames. The APSD element expresses a wakeup period of the station. Upon reception of the APSD element, the AP will buffer the station's traffic and deliver the traffic only during the beacon interval when the station is awake. An APSD station currently in the corresponding mode will wake up at predetermined beacons to listen to the Traffic Indication Map (TIM) in beacon frames. If existence of buffered traffic to the station is signaled through the TIM, the station will remain awake until the AP sends out all the data and the MORE_DATA bit is cleared. By enabling all the data transmission to be scheduled under the same optimized scheduler, the APSD protocol in association with the present invention provides a flexible way to address power saving and non-power saving data as well as QoS and non-QoS data traffic.

The inventor has designed the hierarchical scheduling algorithm to be operable to aggregate all the data to a specific power saving station and order the transmissions to different stations based on the calculated receiving power consumption.

Still another aspect of the invention provides a method of saving power in a wireless network comprising an access point, one or more stations, the APSD protocol, and an algorithm for calculating a receiving power consumption P of downlink data for the stations. The method comprises calculating the receiving power consumption of data to be downlinked to the stations using the algorithm, determining a priority queue ordering of the transmissions based on the power consumption calculated for each station. The method may then continue in accordance with the APSD protocol sending and receiving data.

In another aspect of the present invention, the AP scans the traffic streams of the PS stations, sets up the TIM field in the beacon, then calculates the total receiving power consumption P of data to downlink to each station using the receiving power consumption algorithm. A priority Queue in the AP then arranges the order of the power consumptions P such that $P_1 < P_2 < \ldots P_i \ldots < P_N$ where i is the number of stations, and N is the number of backlogged stations. The AP then sets-up the APSD schedule fields according to [0, $P_1$, $P_2$, ... $P_i$, ... $P_{N-1}$] and the transmission data is transferred to the firmware in the order 1, 2, 3. . . i . . . N.

The power saving method further comprises continuing to transmit the power saving data from the APSD data queue. Upon emptying the buffer for the particular station or reaching marked traffic, the method then clears the "MORE_DATA" field in the last unmarked packet for the sleep mode station, disables the transmission (Tx), and buffers further power saving data until the next beacon.

A PS station will periodically awaken according to the pre-specified beacon interval. When the PS station has detected an AID match in the TIM field of the beacon, the station decodes the data frames on the wireless channel. When the data frame has arrived on the wireless channel and is decoded with the AID match and the MORE_DATA bit set to zero, the station will go back into sleep mode until the arrival of the next beacon.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 6 is a diagram illustrating the operation of several exemplary scheduling and queue management algorithms in the host and firmware for a data exchange between a station and an access point in accordance with various aspects of the present invention;

DETAILED DESCRIPTION OF THE INVENTION

Figure 1:
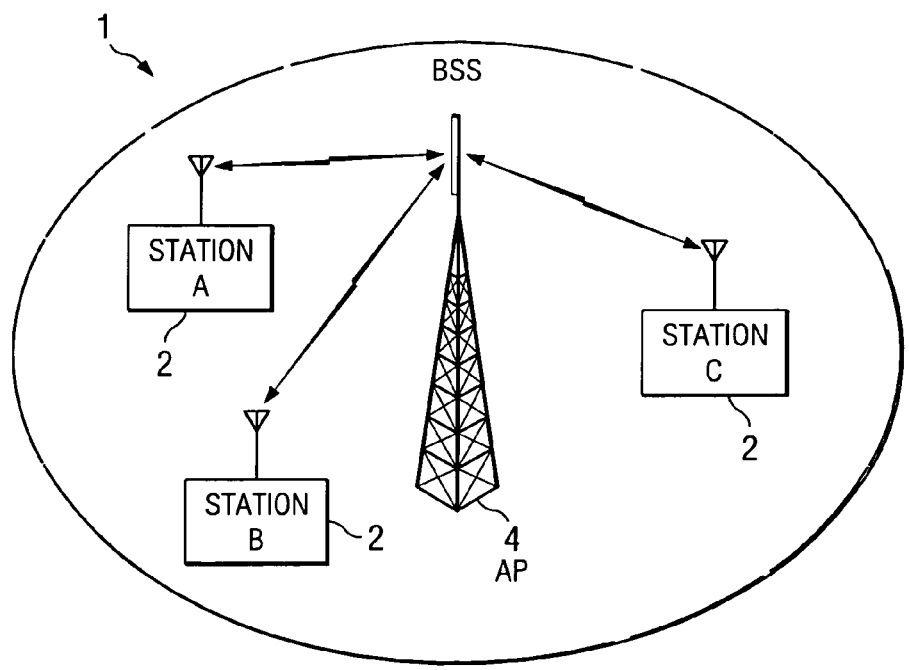
FIG. 1 is a prior art diagram illustrating a basic service set BSS of a wireless network operating in the infrastructure mode.
Figure 2:
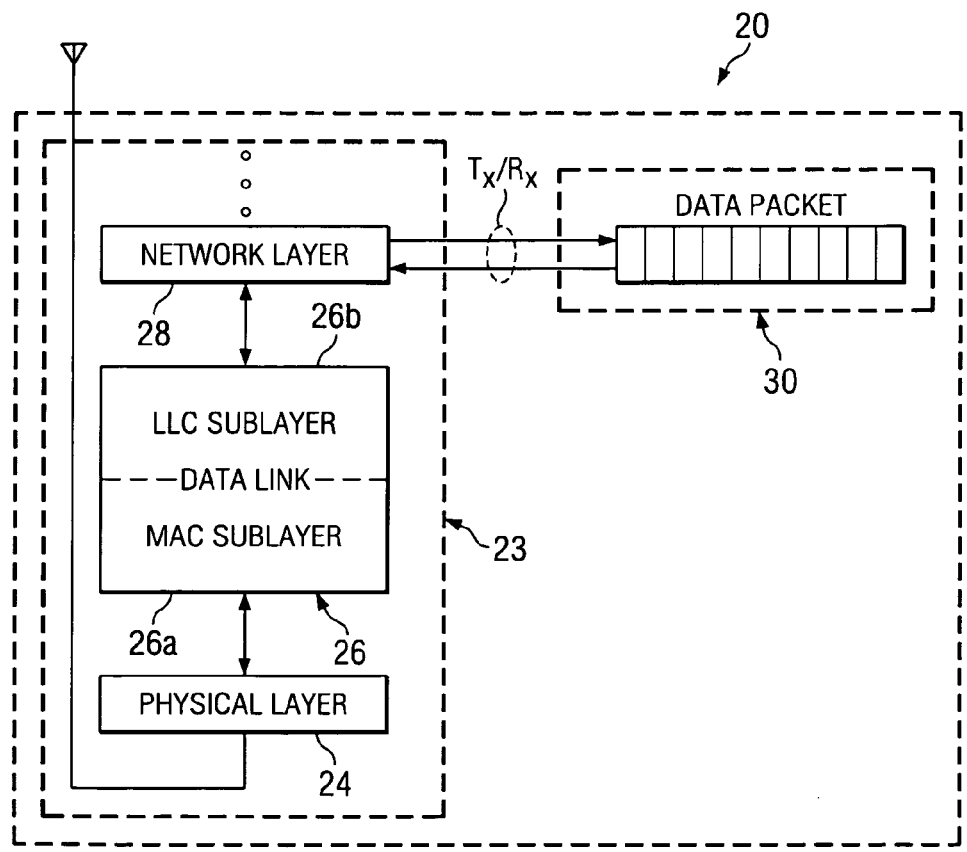
FIG. 2 is a prior art diagram of a wireless transceiver, according to the OSI reference model illustrating a series of protocol layers and a data packet to be transmitted or received.

The present invention will now be described with reference to the attached drawings, wherein like reference numerals are used to refer to like elements throughout. The invention relates to a hierarchical scheduling architecture as a power savings mechanism in a wireless network in which a receiving power consumption calculation and prioritization algorithm is utilized in association with the Automatic Power Save Delivery APSD frame and protocol of 802.11e.

There are two power saving mechanisms in the IEEE 802.11e draft, namely Automatic Power Saving Delivery (APSD) and Schedule Element. The later mechanism is mainly a component of the QoS functionality while, as suggested by the draft itself, permitting additional power saving possibilities. Since the Schedule Element mainly targets at periodic traffic, it is then mainly a QoS schedulers' job to specify the service interval during which a station may go to sleep.

A station capable of APSD and currently in the corresponding mode will wake up at predetermined beacons to listen to the Traffic Indication Map (TIM). If existence of buffered traffic to the station is signaled through the TIM, the station will remain awake until AP sends out all the data and the MORE_DATA bit is cleared. By contrast to the 1999 IEEE 802.11 standard, the station no longer needs to send out a PS-POLL to retrieve data from the AP. Thus, the origin of the term "automatic" in the APSD term is identified.

In order to better appreciate one or more features of the invention, several exemplary implementations of the power saving system, the associated APSD frame, block diagrams for the same, and a power saving method is hereinafter illustrated and described with respect to the following figures.

The invention and associated APSD protocol of FIGS. 3-7 will be initially presented, followed by those of the optimal scheduler based on the receiving power consumption calculation and transmission prioritizing algorithm of the present invention and FIGS. 8-15.

Although electrical power (e.g., P, W, KW) is not synonymous with energy (e.g., WH, KWH, J, mJ), in the context of the present invention the terms "power saving", and "power consumption" have been traditionally used in documents and specifications such as the IEEE 802.11 specifications that use the terms power saving PS, and automatic power saving delivery APSD to express an electrical energy savings or energy consumption improvement. As such, these terms have also been used in the context of the present invention to reflect an electrical energy savings or energy consumption improvement, for example, in a receiving station and the power saving systems illustrated. Thus, the usage of these terms or similar "power" terms is not intended to be limiting and may be used interchangeably to express an electrical energy savings or energy consumption improvement.

Figures 3, 4, 5A, 5B:
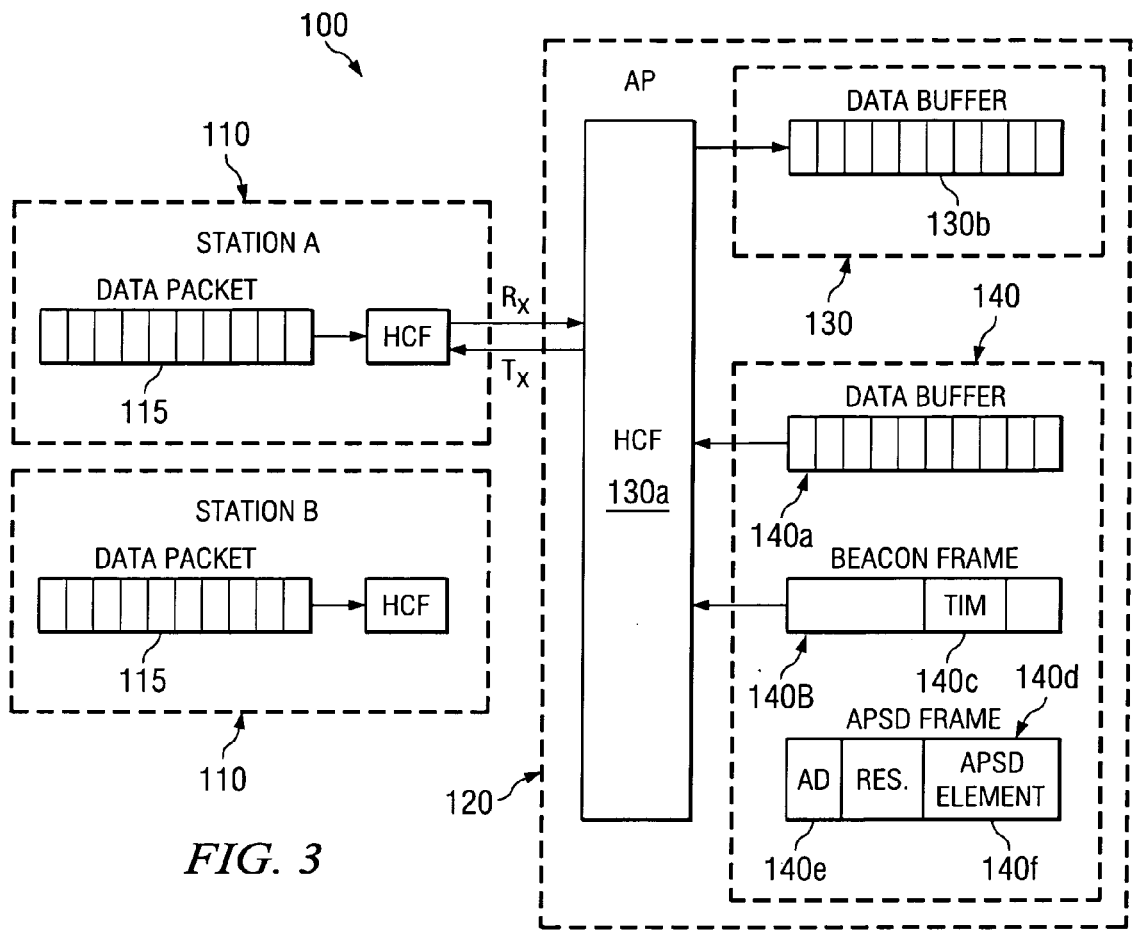
FIG. 3 is a simplified diagram of an exemplary data packet exchange between a station and an access point during an uplink or a downlink.
FIG. 4 is a diagram illustrating exemplary timing relationships used in Inter-Frame Spaces according to IEEE 802.11b using DSSS.
FIG. 5A is a diagram illustrating the Automatic Power Save Delivery Action Frame according to IEEE 802.11e for the APSD frame used in association with the present invention.
FIG. 5B is a diagram illustrating the format of the APSD Element according to 802.11e used in association with the present invention. The APSD element may be included in (re)association frames or in the body of an action frame.

FIG. 3 illustrates a simplified diagram of an exemplary wireless network 100 utilizing the APSD protocol of 802.11e used in association with the present invention during a data packet exchange via an uplink or a downlink. The exemplary wireless network 100, comprises one or more stations STA-A and STA-B 110, that may either uplink a data packet 115 (e.g., of power saving data) transmitted to an access point AP 120, or receive the data packet 115 in a downlink transmission from the AP 120. The AP 120 may further comprise a transceiver having a receiver section $R_X$ 130 and a transmitter section $T_X$ 140.

Data received, for example, according to the hybrid coordination function HCF 130a, is put in data buffer 130b in the $R_X$ 130 section to be extracted and placed on the network infrastructure associated with the AP 120. Data to be transmitted, for example, from the $T_X$ 140 section is assembled in DATA BUFFER 140a after transmission of a beacon frame 140b, comprising a traffic indication map TIM 140c having association IDs (AIDs). Negotiation on parameters, namely activation delay and wakeup period can be executed in the form of an action frame via an activation delay 140e and an APSD element 140f. To save power, STA-A and STA-B awake only periodically at specific beacons according to the wakeup period in the exemplary network 100. Awaking for a predetermined beacon interval, according to the APSD protocol, minimizes time and power that, for example, STA-A 110 may otherwise be wasted contending for the channel with another such station STA-B 110 within the network 100 during other beacon intervals.

The inventors of the present invention have found that minimizing channel contention time during the awake period of an APSD station is a significant factor in wireless network power savings in an APSD capable network.

Thus, the inventors herein have realized that the APSD protocol may be utilized in association with the present invention of the hierarchical scheduling algorithm. The invention is facilitated by the newly specified 802.11e Hybrid Coordination Function (HCF), which incorporates the previous Distributed Coordination Function DCF, the enhanced DCF (EDCF), and the point coordination function PCF. By employing HCF, for example, the AP can obtain access to the wireless channel as needed and is thus capable of transmitting the power saving traffic according to the schedule. Although the APSD utilized in the present invention is discussed in conjunction with the above standards, it should be understood that incorporation may occur in other protocols and such alternatives are contemplated as falling within the scope of the present invention.

The 802.11e Hybrid Coordination Function

The Hybrid Coordination Function (HCF) was proposed by the 802.11e group to provide QoS enhancements to the current 802.11 MAC. HCF uses a contention-based channel access method, called the Enhanced Distributed Coordination Function (EDCF) concurrently with a polling based, contention free (CF) channel access mechanism. Contention based and contention free channel access methods can be alternated freely by the AP. A station (STA), or an access point (AP), may obtain transmission opportunities (TXOP) at a period of time during which the channel is dedicated to the station, using either channel access mechanism.

The APSD protocol used in association with the present invention is substantially based on the contention free method. However, in order to clarify the alternation between contention-based and contention-free transmission essential to the backward compatibility, both are described in the following.

Contention Based Access

EDCF is an enhancement of the original DCF mechanism with the support of service differentiation among different traffic categories. EDCF maintains multiple queues corresponding to different traffic categories rather than a single queue in DCF. Each queue contends for the channel using the original MAC protocol, i.e., a "back-off" interval is generated for each queue and whenever it counts down to zero, a head-of-line packet (packet header) is transmitted.

Prioritized services are provided by assigning a different Arbitration Inter-Frame Space (AIFS) and an initial contention window size CWmin to traffic categories. Intuitively, lower CWmin leads to a shorter back-off interval thus higher chance of channel access. The AIFS denotes the period of channel idle before the back-off counter can decrease. During a period of congestion, a larger AIFS will decrease the channel access opportunity by preventing the back-off counter from decrementing.

If more than one queue reaches zero at the same time, the traffic category with the highest priority wins and transmits. Lower priority traffic categories assume a collision and increase their contention windows.

Contention Free Access

In contrast to EDCF, contention free access is based on a polling scheme controlled by a Hybrid Coordinator (HC) operating at the access point. HC gains control of the wireless medium as needed to send QoS traffic or to issue QoS (+)CF-Polls to stations. The higher priority of HC is obtained by waiting a shorter time between transmissions than the stations using EDCF or DCF access procedures. Specifically, HC can start transmitting when the channel is sensed to be idle for a PIFS (PCF Inter-Frame Space) time.

FIG. 4 summarizes an exemplary timing relationship diagram 200 of the different inter-frame spaces for 802.11b DSSS expressed in microseconds. The times shown for Inter-Frame spaces for 802.11b DSSS, represent exemplary values that may be used in the context of the present invention.

Contention based and contention free transmission can be flexibly alternated by the HC, i.e., the channel is open for contention if it has been idle for a DIFS time.

The Automatic Power Save Delivery (APSD) Protocol

The power saving mechanism under HCF is termed Automatic Power Save Delivery (APSD). As in the 1997 802.11 standard, APSD allows a station to wake up from sleep state periodically to listen to the beacon, in which the AP indicates the presence of buffered traffic using the Traffic Indication Map (TIM) field. However, for a station who's ID is present in TIM, 802.11 defines different behavior from that of 802.11e. In 802.11, an identified station remains awake and sends PS-Polls to the AP to retrieve buffered traffic from the AP. By contrast, in 802.11e, an identified station simply remains awake and silently waits for the frames delivered by the AP. Under both standards, the station can go back to sleep if the AP sets the "MORE_DATA" field in a data frame to zero.

The advantages of APSD over the PS mechanism in the 1997 standard are two-fold. First, a station no longer needs to transmit PS-Polls under APSD and hence the power for transmitting and contending the channel is eliminated. Secondly, the AP has full control of the delivery order of the frames buffered at the AP, which may pertain to different QoS classes.

Handshaking of the wakeup period between an AP and a station willing to enter APSD mode is enabled by the APSD element, which, for example, can be included in an action frame in 802.11e.

FIGS. 5A and 5B illustrate the frame formats of the power saving mechanisms in the IEEE 802.11e draft. FIG. 5A illustrates the format of an action frame 230 used to encapsulate the APSD element and, while FIG. 5B illustrates the format of the APSD element 232 and protocol of 802.11e. The Field Name 235 identifies the specific field within the frames of FIGS. 5A and 5B, together with a corresponding number of octets used within each field.

Activation Delay 240, indicates the duration in number of beacon intervals, that the activation for APSD is to be delayed. Essentially, this indicates how many beacon intervals, from this point, before APSD operation should be performed for the STA. Once the APSD is activated, the transmission will then be decided by the scheduler at each beacon.

Reserved 245, specifies reserved internal usage.

APSD element 250, points to the contents of the APSD elements, the fields of which are identified below:

Element ID 280, a marker for the APSD element. When the AP/STA decodes this number it recognizes that it is an APSD element. Different numbers denote different types of elements.

Length 285, specifies how many bytes follow this field in the present element. (e.g., in the APSD, the length=wakeup period+beacon offset).

Wakeup Period 290 identifies the number of beacon intervals during which the non-AP QSTA is requesting the QAP to buffer MSDU and management frames before releasing the frames for delivery using a prioritized, or parameterized, delivery mechanism. Or, the number of beacon intervals that the data should be buffered before delivery to the STA. Because the STA is in sleep mode during this interval, the STA will wake up after this period for data to be sent from the AP. The wakeup period is addressing precisely how the "releasing the frames for delivery using a prioritized, or parameterized delivery mechanism" should take place through the scheduler of the present invention.

Beacon Offset 295, specifies a number, wherein the station wakes when: Beacon Offset=(TSF/Beacon Interval) modulo Wakeup period.

For example, assume:
Wakeup Period=4
Beacon Offset=2
Beacon interval=100 ms.

Assume, also that the STA enters sleep mode at or before time=0. The STA will then periodically wake once per 4 beacon intervals, (e.g., 400 ms). However, this does still not specify precisely which of these intervals to wakeup, such as to sleep for the $1^{st}$, $2^{nd}$, $3^{rd}$ beacon interval and wakeup at the $4^{th}$ interval, or sleep for the $2^{nd}$, $3^{rd}$, and $4^{th}$, and wakeup at the $5^{th}$ interval. The beacon offset identifies this as the specific intervals, which satisfy the above beacon offset equation. In this example, the beacon offset is 2, thus, the STA will wake when: (TSF/Beacon Interval) modulo Wakeup period=2 (the beacon offset). When this occurs, the STA awakens on the $2^{nd}$, $6^{th}$, and $8^{th}$ beacon interval. These intervals are identified by calculating the "current beacon interval index", which is:

Current beacon interval index=TSF/beacon interval;

Where TSF is the timing sync function (essentially a timer). For example, if TSF=2000 ms, then the current beacon interval index=2000 ms/100 ms=20. Thus, mod (20/4 (Wakeup period)=0!=2 (beacon offset). Therefore, the STA should not wake for the current beacon interval. However, if the TSF=2200 ms, according to the same variables and calculation, the STA should wakeup.

The Automatic Power-Save Deliver APSD Element of FIG. 5B, contains information that a non-AP QSTA can use to indicate to the QAP whether the non-AP QSTA is currently in APSD mode, and how long traffic should be buffered for before being delivered to the non-AP QSTA. The APSD element may be included in (re)association requests in order to activate the facility at association time. The APSD element may also be sent to the QAP using the action frame, to enable or disable automatic power-save delivery. The element information field is defined in Figure 42.13. In essence, the APSD element provides a one-time initialization, in which the station tells the AP how they should coordinate. The APSD may buffer the traffic for a certain time so the STA can sleep, and then deliver the transmission.

Scheduling Architecture

The hierarchical scheduling architecture of the present invention is employed for QoS provisioning and power savings. In this architecture, a "per flow" based scheduling algorithm is performed on the host side, while a "priority" based scheduling is performed on the firmware. Such a scheduling architecture is particularly suitable for the Texas Instruments WLAN chips and other such devices where resources are generally abundant on the host while comparatively limited in the firmware.

Queue Management

FIG. 6 illustrates a diagram 600 of the operation of several exemplary scheduling and queue management algorithms in the host and firmware for a data exchange between a station and an access point in accordance with various aspects of the present invention.

Generally speaking, in one example, a per flow based queue 610 is maintained at the host 620 while a per priority or service level based queue 630 is maintained on the firmware 640 where resources are limited. A service level is, for example, a measurement of the performance of a system or service such as a percentage of time a system is operative, or a percentage of successful data transactions.

In accordance with the invention, the queues are managed differently in an access point AP 650 than in a station STA 660. For example, for the AP 650 implementation, traffic stream queues are maintained on the host 620, whereas priority queues are maintained by the firmware 640. This means there may be a larger number of stream queues on the host 620 while only a small number of priority queues on the firmware 640.

For the STA 660 implementation, the host 620 maintains a queue per traffic stream, while the firmware 640 maintains a queue for each priority. It should be noted that a per stream queue on the host at a station may be desirable, as multiple streams belonging to the same priority may co-exist. For example, a user may simultaneously have streaming video and video conferencing. It may be improper to put these two traffic flows in different priorities. Therefore, scheduling may need to be performed on these two streams, thus a per stream queue may be preferred in some situations.

The current draft of 802.11e, however, does not require data frames to match the TID in the QoS Poll frame. If any future revision requires otherwise, the firmware may maintain a separate queue for each Tspec on the station side.

The Scheduling Algorithm

As illustrated in FIG. 6, in accordance with the present invention, a per flow based scheduling algorithm 610 is used on the host side 620. A data frame transferred to the MAC from an upper layer is first put into the corresponding flow based queue 610 (e.g., POWER SAVING DATA 670 is put into the power saving queues 672) on the host side 620. Queued frames will then be scheduled onto the firmware 640 using the algorithms (e.g., WFQ, or EDF as shown in association with the STREAMING FLOWS and PREMIUM DATA of FIG. 6).

A per priority based scheduling 630 is employed on the firmware 640. The firmware 640 places the traffic into a corresponding priority queue 630 and will schedule the frames onto the wireless channel using a simple strict priority. For example, POWER SAVING DATA 670 put in the flow based queues 672 is placed into a corresponding priority based queue 674 for scheduling onto the WLAN.

A poll frame will be generated at the host and go through the same path as data, except that the poll does not need policing on the host. Also, since no data is associated with a poll, only certain parameters need to be transferred from the host to the firmware and the actual polling frame can be generated with the assistance of pre-stored templates.

Observations for Scheduling Power Saving Traffic

Power saving traffic is dedicated by a particular priority on the firmware side and served using a First In First Out memory (FIFO) to reduce complexity. The inventor of the present invention has discovered that the transmission order of power saving traffic can be a factor determining when a station will go to sleep. Consequently, the inventor has realized that the scheduling algorithm on the host should be performed carefully in order to minimize the total power consumption of the power saving stations. To this end the inventor has made two key observations.

First, it is optimal to send out all the data of a station consecutively and instruct the station back to the sleep mode using, for example, the MORE_DATA bit once the transmission is finished. Otherwise, if this action were not taken, a station may needlessly remain awake consuming power on the channel decoding another station's traffic before the reception of all its own data.

Secondly, it is optimal to first transmit to the station with the lowest total power consumption for receiving all its data (the scheduled amount of data in the current beacon interval TBTT), since a key objective of the invention is achieving the least total power consumption for reception.

Figure 7:
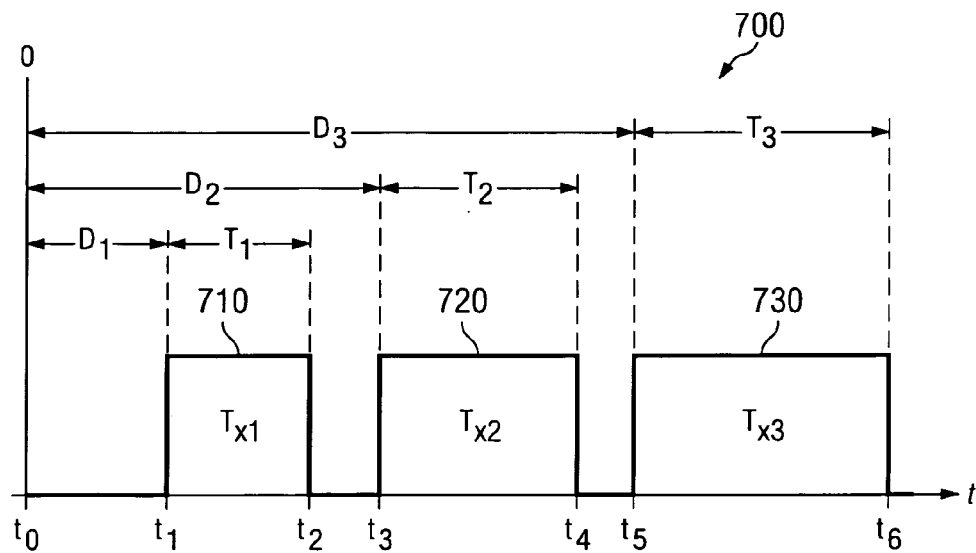
FIG. 7 is a timing diagram illustrating of three exemplary data transmissions that are scheduled and transmitted by the AP to three different PS stations in accordance with an aspect of the present invention.

FIG. 7, for example, illustrates a timing diagram 700, of three exemplary transmissions $T_{x1}$ 710, $T_{x2}$ 720, and $T_{x3}$ 730 initiated, scheduled, and transmitted by the AP to three different stations (i), where station i=1, 2, 3 . . . Assume for the sake of illustration, that the transmission time in one application is essentially proportional to the total receiving power consumption, wherein the power consumption of each reception is symbolized by the length or time of the transmission. Thus, each transmission $T_{xi}$ has a total transmission power consumption (P), where this power consumption $P_{(i)} = P_1, P_2, P_3$ . . . Each transmission $T_{xi}$ is also scheduled by the AP for transmission to station (i) at times $D_{(i)} = D_1, D_2, D_3$ . . . after a certain beacon. Note, that this type of ordering, in one aspect of the invention and as illustrated in FIG. 7, is accomplished by scheduling the transmission with lowest total receiving power consumption first. Thus in the scheduling, because $P_1 < P_2 < P_3 < \ldots P_i$, then the transmissions $T_{x1}$ 710, $T_{x2}$ 720, and $T_{x3}$ 730 are scheduled such that $T_{x1}$ is followed by $T_{x2}$ followed by $T_{x3}$.

The inventor realized that by ordering the transmission of PS traffic in increasing order of receiving power consumptions, the total power consumption of all the stations on a WLAN may be minimized. Scheduling the transmissions with lower receiving power consumptions first, then, creates the least total power consumption for all the stations. This may be best understood by examining the counterpoint to this assertion. If, by contrast, an algorithm was devised wherein this longer transmission $T_{x3}$ 730 was first scheduled and transmitted, followed by the transmissions of $T_{x2}$ 720 and $T_{x1}$ 710 subsequently.

According to APSD protocol, during transmission $T_{x3}$ 730, stations 1, 2, and 3 are awake; during transmission $T_{x2}$ 720, station 1 and 2 are awake; and during transmission $T_{x1}$, station 1 is awake. Therefore the total power consumption of stations 1, 2, and 3 during this beacon interval is $(3P_3 + 2P_2 + 1P_1)$. On the contrary, if the invented scheduling algorithm is employed, during transmission Tx1 730, stations 1, 2, and 3 are awake; during transmission $T_{x2}$ 720, station 2 and 3 are awake; and during transmission Tx3, station 3 is awake. Therefore the total power assumption of stations 1, 2, and 3 during this beacon interval is $(3P_1 + 2P_2 + 1P_3)$. Since $P_1 < P_2 < P_3$, the total power consumption is minimized.

Figure 8:
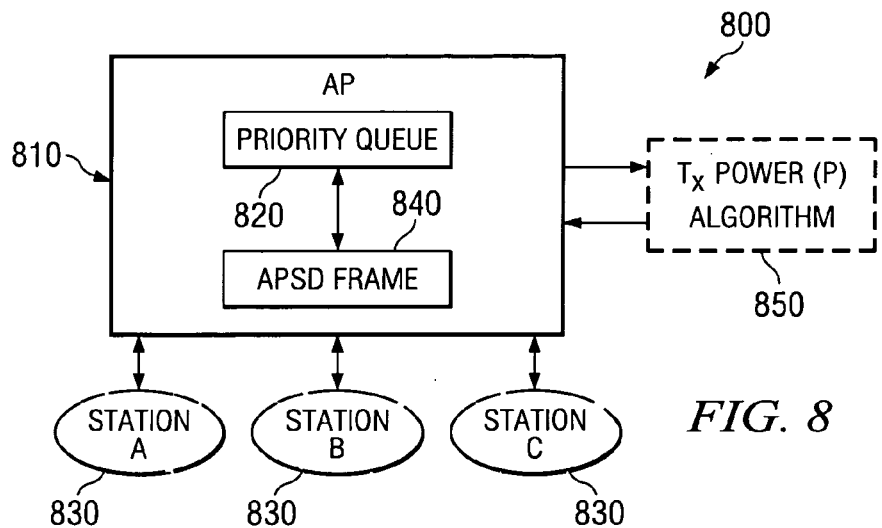
FIG. 8 is a simplified block diagram of an exemplary power savings system used in a WLAN utilizing a priority queue, an APSD protocol, and a receiving power consumption calculation and transmission prioritization algorithm in accordance with various aspects of the present invention.

FIG. 8 illustrates a simplified block diagram 800 of an exemplary power savings system used in a WLAN in accordance with various aspects of the present invention. The power savings system 800 comprises an access point 810 having a priority queue 820, one or more stations 830, an APSD frame 840 used in association with an APSD protocol, and an algorithm 850 for calculating a total receiving power consumption of data transmissions for the stations 830, and for prioritizing the scheduling order of the transmissions according to the APSD protocol, as stored in the priority queue 820 based on an increasing order of receiving power consumptions.

Figure 9:
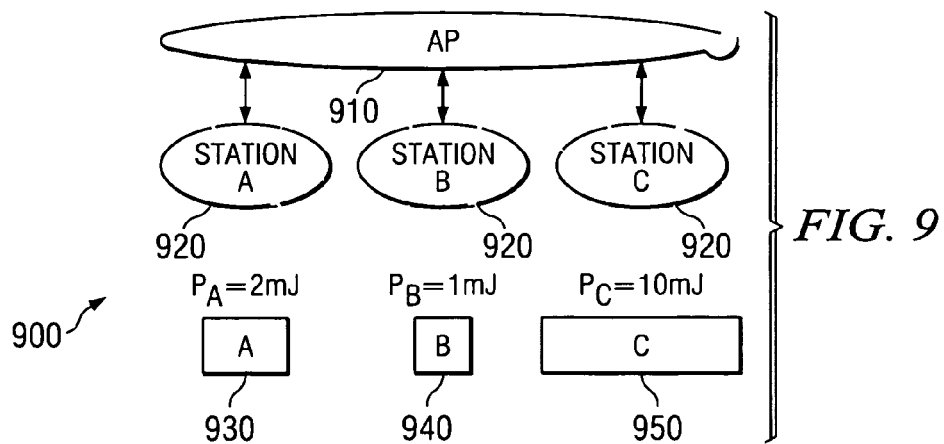
FIG. 9 is a simplified block diagram of an exemplary WLAN illustrating a different receiving power consumption requirement to each station of the WLAN.
Figure 10:
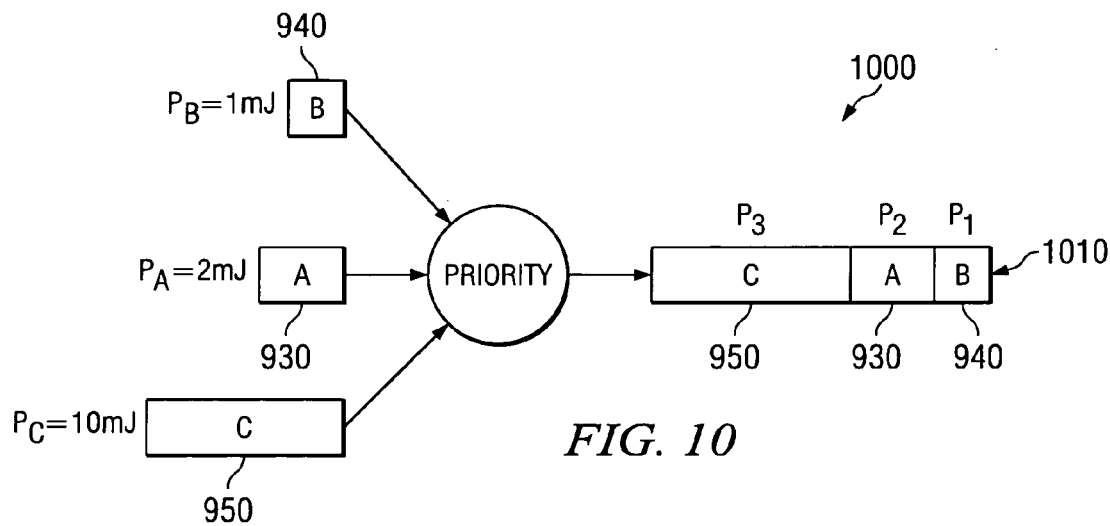
FIG. 10 is a diagram illustrating the results of the priority ordering of the optimum scheduling algorithm in accordance with an aspect of the present invention.
Figure 11:
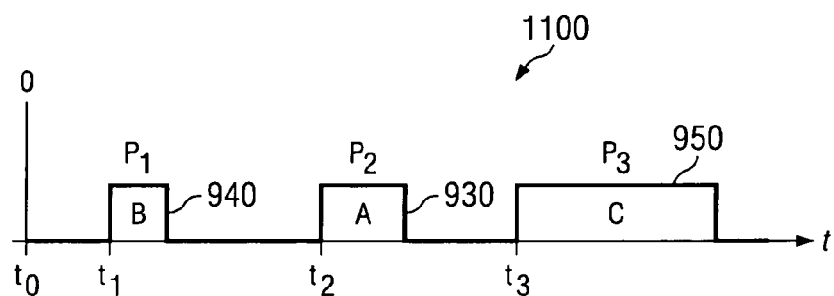
FIG. 11 is a timing diagram illustrating the transmission timing response of the prioritization ordering of the receiving power consumption scheduling algorithm in accordance with an aspect of the present invention.

FIGS. 9-11 further illustrate simplified forms of the prioritizing, ordering, and scheduling of the data transmissions based on the receiving power consumptions P in accordance with several aspects of the present invention. FIG. 9, for example, illustrates a simplified block diagram of an exemplary WLAN system 900 for saving power in accordance with the invention. WLAN system 900 comprises an AP 910 and three stations 920. Each station 920 is to receive a transmission ($T_x$) having a different receiving power consumption P from the AP.

Again, for the sake of illustration, assume that the total receiving power consumption of each transmission is measured in an arbitrary quantity of milli-joules (mJ) of energy symbolized by the length or time of the transmission. For example, station A is to receive a transmission A ($T_{xA}$) 930 having a receiving power consumption $P_A$=2 mJ, station B will receive a transmission B ($T_{xB}$) 940 having $P_B$=1 mJ, and station C is to receive a transmission C ($T_{xC}$) 950 having $P_C$=10 mJ.

FIG. 10 is an exemplary diagram of the operation of the optimum scheduling algorithm 1000 illustrating the results of the priority ordering of the transmissions in association with the WLAN system 900 of FIG. 9. Variables associated with the three exemplary transmissions $T_{xA}$ 930, $T_{xB}$ 940, and $T_{xC}$ 950 are first processed by the receiving power consumption algorithm to compute the expected receiving power consumptions $P_A$=2 mJ, $T_B$=1 mJ, and $T_C$=10 mJ to stations A, B, and C respectively. Based on these computed power consumptions, a higher priority is assigned to the smaller power consumptions, and the transmission data packets are arranged according to this increasing order of power consumptions as stored in packet buffer 1010.

For example, the receiving power consumption calculated for the data transmission $T_{xB}$ 940 to station B is lowest at $P_B$=1 mJ, so is assigned the highest priority level $P_1$, as represented by its "first-in" position to the far right in the packet buffer 1010. Likewise, station A's $T_{xA}$ 930 receiving power consumption is next lowest at $P_A$=2 mJ, so is assigned the next highest priority level $P_2$ next to $T_{xB}$ 940 in the packet buffer 1010. Finally, station C's transmission $T_{xC}$ 950 is the highest of the three receiving power consumptions at $P_C$=10 mJ, so is assigned the lowest priority level $P_3$ in the last-in position next to $T_{xA}$ 930 in the packet buffer 1010.

FIG. 11 illustrates a timing diagram of the response 1100 of the transmission ordering produced by the power consumption prioritizing and scheduling algorithm of FIG. 10. Because data transmission $T_{xB}$ 940 to station B is lowest at $P_B$=1 mJ, this transmission is scheduled for first transmission by the AP using the APSD protocol. Thus, transmission $T_{xB}$ 940 is first to appear on the timing diagram response 1100 at time $t_1$. In like manner, data transmission $T_{xA}$ 930 to station A is next lowest at $P_A$=2 mJ, and is scheduled for the second transmission using the APSD frame and protocol appearing on the timing diagram at time $t_2$. Finally, data transmission $T_{xC}$ 950 to station C is highest at $P_C$=10 mJ, and is scheduled for the third and final transmission using the APSD protocol appearing on the timing diagram at time $t_3$.

Therefore, the present invention provides a wireless network power savings system in an algorithm that minimizes the overall receiving power consumptions.

Calculating Receiving Power Consumption

The actual formula or algorithm for calculating the total receiving power consumption to a PS station is often difficult as there is no well acknowledged model. However, the total receiving power consumption of the frames to a certain PS station is related to the transmission rate modulation and coding, the packet lengths. Higher transmission rates should result in higher receiving power consumption but shorter transmissions. However, high rate transmissions of larger and or longer packet sizes should result in increasingly higher power consumptions. In general, any number of equations may be formulated which express these and other such transmission variables to calculate the total receiving power consumption. Thus, the following is an example of a relationship, which may be used in calculating the power consumption.

In the algorithm of the present invention, the total receiving power consumption P may be represented as a function of:

$$P = f(Tx\_rate, Packet\_lengths, Number\_packets). \quad (1)$$

Tx_rate is the transmission rate of the wireless network based on the transmission modulation and coding scheme;

Packet_length is the length of the data frames to a PS station; and

Number_packets is the number of packets in the queue.

FIGS. 12-15 are flow charts illustrating various method aspects of saving power in a wireless network using an APSD protocol and a receiving power consumption calculation algorithm in accordance with the power saving system of FIG. 8, and various aspects of the present invention.

Figure 12:
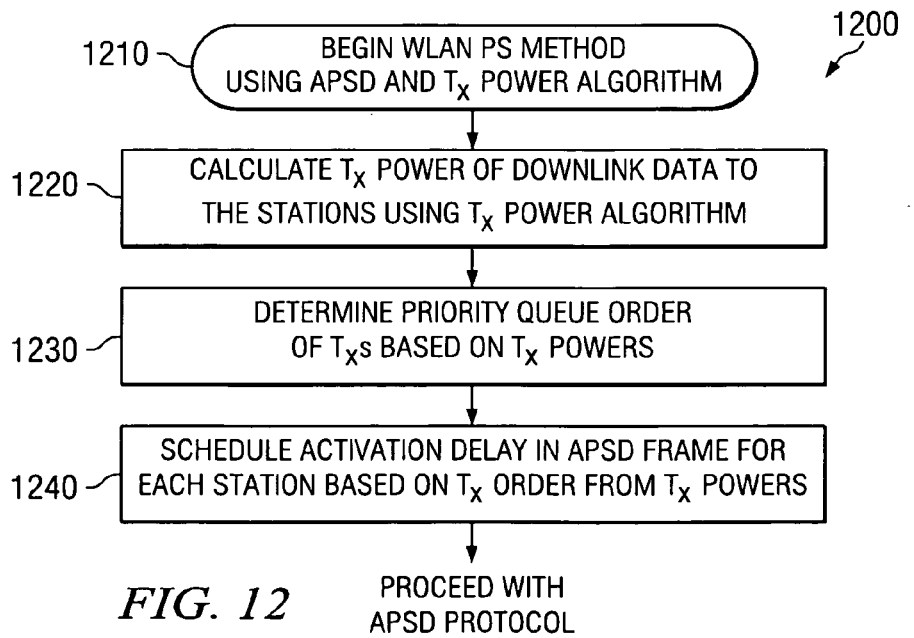
FIGS. 12-15 are flow charts illustrating various method aspects of saving power in a wireless network using an APSD protocol and a receiving power consumption calculation algorithm in accordance with the power saving system of FIG. 8, and various aspects of the present invention.

Referring now to FIG. 12, an exemplary method 1200 is illustrated for saving power in a wireless network comprising an access point AP having a priority queue, one or more stations (STAs), an APSD frame and protocol, and an algorithm for calculating the receiving power consumption of downlink data for the stations. Method 1200 further includes prioritizing the scheduling of the transmissions according to the APSD protocol, as stored in the priority queue based on an increasing order of transmission power consumptions in accordance with the present invention.

While the method 1200 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 1200 according to the present invention may be implemented in association with the network elements, algorithms, protocols and formats illustrated and described herein as well as in association with other elements, algorithms, protocols and formats not illustrated.

The method 1200 comprises initially accessing the current data to be transmitted to each station using the algorithm, and calculating the total receiving power consumption P to each station. The algorithm and the priority queue in the access point are then used to determine and arrange the priority order of the transmissions based on the transmission power consumption calculated for each station. The method 1200 then proceeds as usual in accordance with the APSD protocol of 802.11e, wherein data is transmitted to PS STAs in order of increasing total receiving power consumption.

The exemplary power saving method 1200 of FIG. 12, in accordance with the wireless network of FIG. 8, begins at 1210. Initially, at 1220, the access point accesses the current data to be transmitted (e.g., Tx, downlinked) to each station using the algorithm, and calculating the total receiving power consumption P to each station. The algorithm and the priority queue in the access point are then used at 1230 to determine and arrange the priority order of the transmissions based on the power consumption calculated for each station.

Thereafter, the power savings method of the present invention continues as discussed in association with the APSD protocol of 802.11e for a wireless network.

Thus, the present invention provides an algorithm that minimizes the overall receiving power consumptions for a wireless network operating under the 802.11e APSD power saving protocol.

Scheduling—At the AP

At the beginning of a beacon transmission, the AP will scan the queues corresponding to different PS stations and setup the TIM field in the beacon. AP then calculates the total receiving power consumption for receiving the data to each PS station, respectively. In general, assume $$P_1 < P_2 < \ldots < P_i < \ldots < P_N, \quad (2)$$

where $P_i$ denotes the total power consumption needed of receiving the data to station i; and N denotes the total number of backlogged stations. The AP then will then transmit the data, for example, to firmware in the order 1, 2, . . . i, . . . , N.

Once the queue has been emptied for a particular station, the MORE_DATA field in the last packet pertaining to this queue should be cleared to zero upon the reception and decoding of which station should enter sleep mode. Notice that once a queue has been emptied, the transmission from this queue should be disabled until the next beacon, even if additional packets arrive from an upper layer.

Figure 13:
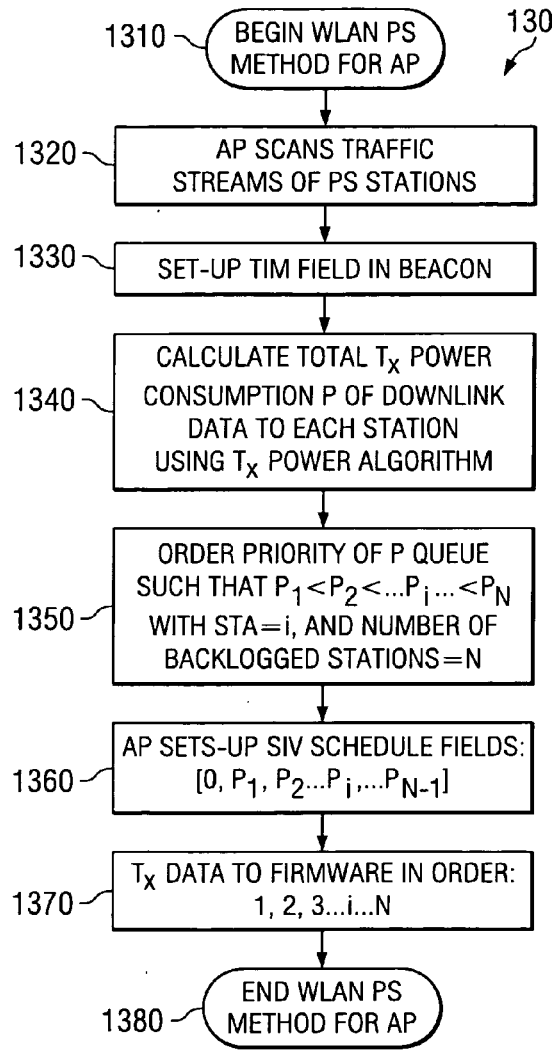

FIG. 13 is a flow chart illustrating a method 1300 of saving power in a wireless network using an APSD protocol and a receiving power consumption calculation algorithm in accordance with the access point and the PS system of FIG. 8 of the present invention.

The method 1300 begins at 1310. Initially, at 1320, an access point scans the current traffic streams of data to be transmitted to one or more power save (PS) stations (i). At 1330, a TIM field is set-up in the beacon as shown and previously described in association with 140c of FIG. 3. At 1340, a total receiving power consumption P of the PS data to be downlinked to each station (i) is calculated using the receiving power consumption and prioritizing algorithm. The algorithm (e.g., from equation (1) above) and a priority queue in the access point are then used at 1350 to arrange the transmissions to the PS stations by a transmission priority order based on an increasing order of the receiving power consumption calculated for each station, for example, as shown and discussed in association with equation (2) above. The awakening time is then scheduled at 1360 utilizing the APSD frame and protocol for each station based on the priority ordering from the power consumptions, for example, as shown and discussed in association with equation (3) above. Then, the transmission data is transferred, for example, to firmware in the order established as shown and discussed in association with equation (4) above, wherein transmissions are served to the PS stations according to the schedule.

Figure 14:
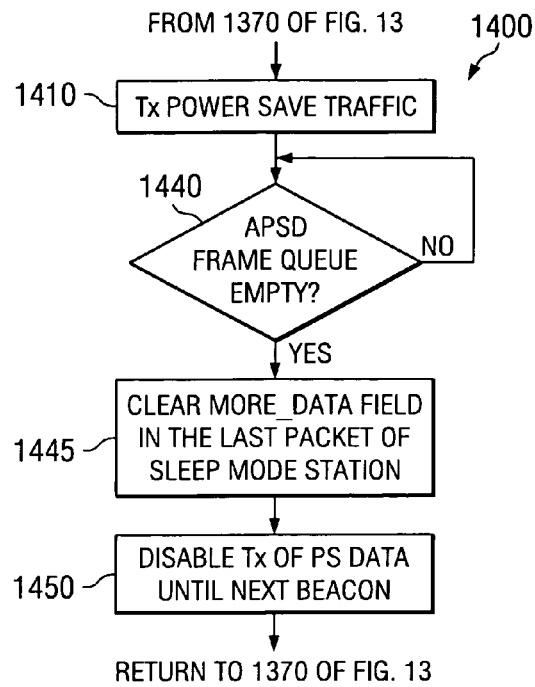

FIG. 14 illustrates an optional method 1400, for handling new PS data that may arrive while transmitting the current data to firmware at 1370 of FIG. 13. In other words, method 1400 of FIG. 14 occurs in parallel with 1370 of FIG. 13, to provide a method of watching for and handling new PS data while transmitting the current data. Data is not dumped in one large batch; rather, data is continuously transferred to the firmware as buffer space is cleared by data transmission to the wireless channel.

In FIG. 14, for example, the method 1400 begins at 1410, where the PS data is transmitted based on the priority established by the total power consumption ordering of the APSD frame schedules. When it has been determined at 1440 that the APSD frame queue in the AP for a particular station has been emptied, the MORE_DATA field in the last packet pertaining to this queue is cleared to zero at 1445, and the PS station is instructed to enter sleep mode. At 1450, the $T_x$ is disabled, and further PS data is buffered until the next beacon. Thereafter, the PS method 1400 used in association with the APSD protocol of 802.11e ends and returns to 1370 of FIG. 13.

Scheduling—At the Stations

A station i will wake up periodically for the pre-specified beacon interval. Upon reception of the beacon, the station determines if its' AID matches that of the AID in the TIM field of the beacon. If no AID match is found, the station will immediately go back to sleep; otherwise the station will remain awake.

If the AID matches that of the AID in the TIM field, the power saving station will remain awake and decode the frames on the wireless channel. Upon the reception of a frame addressed to itself along with the MORE_DATA bit set to zero, the station will go to sleep and prepare for waking up at the next beacon.

Figure 15:
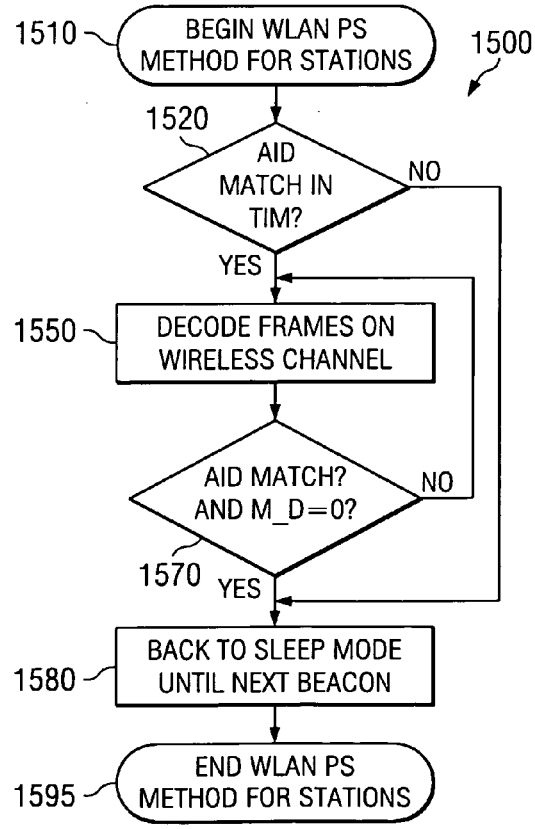

For example, FIG. 15 is a flow chart illustrating a method 1500 of saving power in a wireless network using an APSD protocol and a receiving power consumption calculation algorithm in accordance with the one or more PS stations and the PS system of FIG. 8 of the present invention.

The method 1500 begins at 1510. Initially, at 1520, a PS station (i) awakes at the periodic beacon interval and checks to see if its AID matches that of the TIM field of the beacon. If, at 1520, the AID does match, then the PS station remains awake and decodes the frames on the WLAN at 1550. Thereafter, at 1570, upon decoding a frame addressed to the PS station (AID frame match) along with the MORE_DATA field set to zero, the station will return to the sleep mode at 1580 until the next beacon. However, if at 1570 the AID does not match that of the PS station, or the MORE_DATA field is not set to zero, the PS station remains awake and decodes a further frame on the WLAN at 1550.

Otherwise, if the AID does not match, at 1520, the PS station (i) returns to the sleep mode at 1580, and the WLAN PS method 1500 for PS stations ends at 1595.

Scheduling QoS Traffic

QoS traffic is easily accommodated via the priority-based architecture of the present invention. Upon reception of priority QoS traffic from a higher layer, the strict priority scheduler will deliver the QoS traffic by interrupting the ongoing PS data (as indicated by the "Pseudo Preempt" shown in FIG. 8 as a special case to provide an interrupt). It should also be noted that power saving data 870 has a higher priority than best effort data and hence will not be disrupted by best effort data.

The presence of QoS data may delay the transmission of the PS data and hence the APSD station may have to decode irrelevant data addressed to other QoS stations and introduce more power consumption.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A system for saving power in a wireless network, comprising:
    an access point having a priority queue;
    two or more stations with at least one station being a fixed wireless station;
    an Automatic Power Saving Delivery (APSD) frame having schedule information of a data transmission to the two or more stations;
    an algorithm in the access point for calculating a receiving power consumption of the data transmission for the two or more stations using a time of transmissions;
    determining a priority transmission ordering based on an increasing order of the receiving power consumption of the data transmission; and
    transmitting to the two or more stations the APSD frame of the schedule information using the priority transmission ordering so that the total power consumption of the network is minimized by transmitting in increasing order of the receiving power consumption of the data transmission, and wherein at least one of the two or more stations selectively awake from a sleep mode for the data transmission therewith based on the schedule.

2. The system of claim 1, wherein the access point is configured to generate a TSPEC element comprising a Power Saving (PS) interval for specifying a timing offset relative to the current transmission.

3. The system of claim 1, wherein the access point is further operable unicast an APSD frame to the one or more stations to alter one or more of the scheduled wake-up times of the station in response to errors on the network and to the arrival of higher priority data.

4. The system of claim 1, wherein the access point is further operable broadcast an APSD frame to the at least one of the at least stations to alter one or more of the scheduled wake-up times of the at least one of the at least station in response to errors on the network and to the arrival of higher priority data.

5. The system of claim 1, wherein the access point and priority queue is operable to allow the access point to ignore current scheduling activities and perform scheduling in response to errors on the network and to the arrival of higher priority data.

6. The system of claim 1, wherein the algorithm for calculating the receiving power consumption of downlink data for the two or more stations is a function of one of a rate of the data transmission, a packet size of the data transmitted, a transmission time of the data transmitted, a packet length, a number of the packets in the transmission, and a combination thereof.

7. The system of claim 1, wherein the algorithm is further operable to aggregate together a plurality of low power transmissions comprising all currently scheduled data to a PS station before calculating the receiving power consumption.

8. The system of claim 1, wherein the priority queue of the access point is operable to order and enable the lowest transmission power downlink first.

9. The system of claim 8, wherein the priority queue is further operable to order subsequent transmissions based on which transmission has the lowest transmission power.

10. A method of saving power in a wireless network comprising an access point, and one or more stations, wherein at least one station is a fixed wireless station, the method comprising:
    calculating by the access point a plurality of receiving power consumptions of data transmission to respective stations;
    determining a priority queue ordering of the transmissions based on the plurality of receiving power consumptions calculated for each station such that the total power consumption of the network is minimized by ordering the transmissions in increasing order of the receiving power consumptions;
    scheduling the data transmission for each station based on the transmission order;
    communicating the schedule of the data transmission to each station; and
    transmitting the data to the one or more stations according to the schedule.

11. The method of claim 10, further comprising:
    determining whether a frame queue is empty in the access point;
    informing the corresponding station about the end of transmission if the frame queue is empty in the access point;
    disabling the transmission until next beacon; and
    returning the corresponding station to the sleep mode until the next beacon.

12. The method of claim 10, further comprising:
    awaking a station from a sleep mode to monitor a beacon from the access point;
    determining whether the station's association ID is indicated in the beacon;
    returning the station to the sleep mode if the station's association ID is not indicated;
    decoding the frames on the wireless channel; and
    returning the station to the sleep mode until the next beacon, if the station's association ID matches in a frame and a MORE_DATA bit in the beacon is set to zero.

13. The method of claim 12, further comprising:
    determining whether downlink data is to be transmitted from the access point to the station if the station's association ID is indicated in the beacon; and
    keeping the station awake until an Automatic Power Saving Delivery (APSD) frame containing schedule data is received.

14. The method of claim 13, further comprising returning the station to sleep mode after receipt of the APSD frame, and maintaining the station in sleep mode until the schedule data dictates that the station awaken.

15. The method of claim 12, wherein awaking the station to monitor a beacon from the access point, comprises awaking the station at a periodic interval to monitor a beacon from the access point.

16. The method of claim 12, wherein determining whether a station's association ID is indicated, comprises determining whether a stations association ID is indicated within a Traffic Indication Map (TIM) of the beacon.

17. The method of claim 10, further comprising:
- scheduling an activation delay of the data transmission in an APSD frame for each station based on the transmission order;
- sending out the APSD frames containing the schedule data;
- clearing a MORE_DATA field in the last packet of the priority queue;
- allowing the station to go into sleep mode until the next beacon.

* * * * *